(12) United States Patent
Hasan et al.

(10) Patent No.: US 11,351,014 B2
(45) Date of Patent: Jun. 7, 2022

(54) METHODS OF DIGITALLY DESIGNING ARTIFICIAL TEETH

(71) Applicant: DENTSPLY SIRONA Inc., York, PA (US)

(72) Inventors: Md Abu Hasan, York, PA (US); Robert K Stupplebeen, Webster, NY (US)

(73) Assignee: DENTSPLY SIRONA INC., York, PA (US)

( * ) Notice: Subject to any disclaimer, the term of this patent is extended or adjusted under 35 U.S.C. 154(b) by 455 days.

(21) Appl. No.: 16/427,765

(22) Filed: May 31, 2019

(65) Prior Publication Data

US 2019/0365514 A1 Dec. 5, 2019

Related U.S. Application Data

(60) Provisional application No. 62/679,093, filed on Jun. 1, 2018.

(51) Int. Cl.
| | | |
|---|---|---|
| *A61C 13/097* | (2006.01) | |
| *A61C 13/00* | (2006.01) | |
| *A61C 11/00* | (2006.01) | |

(52) U.S. Cl.
CPC ........ *A61C 13/0004* (2013.01); *A61C 13/097* (2013.01); *A61C 11/00* (2013.01)

(58) Field of Classification Search
CPC .... A61C 13/0004; A61C 13/097; A61C 11/00
See application file for complete search history.

(56) References Cited

U.S. PATENT DOCUMENTS

| | | | | |
|---|---|---|---|---|
| 5,273,429 A | * | 12/1993 | Rekow | A61C 13/0004 433/215 |
| 5,359,511 A | * | 10/1994 | Schroeder | A61C 13/0004 433/75 |
| 7,234,937 B2 | * | 6/2007 | Sachdeva | A61C 7/146 433/24 |

(Continued)

FOREIGN PATENT DOCUMENTS

| | | |
|---|---|---|
| DE | 102011005899 A1 | 9/2012 |
| WO | 9319689 A1 | 10/1993 |
| WO | 2015092000 A1 | 6/2015 |

OTHER PUBLICATIONS

Fan, Q., et al. "Virtual Adjustment of the Occlusal Surface for Complete Denture Tooth Arrangement" IEEE Int'l Symp. on Bioelectronics & Bioinformatics, pp. 166-169 (2015) available from <https://ieeexplore.IEEE.org/document/7344947> (Year: 2015).*

(Continued)

*Primary Examiner* — Jay Hann
(74) *Attorney, Agent, or Firm* — Dentsply Sirona Inc.

(57) ABSTRACT

Digitally designing artificial teeth for use in a dental prosthesis and/or dental restoration. Designing natural-looking functional artificial teeth based on computer-aided design using reference dentition articulated in a predetermined occlusal scheme as a basis for effective design. In particular, the occlusal surfaces of posterior artificial teeth are designed in a digital environment to provide effective consistent functional set-up and performance, especially across a variety of occlusal schemes, in the preparation of dental prostheses.

11 Claims, 7 Drawing Sheets

(56) References Cited

U.S. PATENT DOCUMENTS

| | | | | |
|---|---|---|---|---|
| 8,727,776 | B2* | 5/2014 | Mehl | A61C 9/0053 |
| | | | | 433/223 |
| 9,226,806 | B2* | 1/2016 | Manai | A61C 11/00 |
| 10,779,917 | B2* | 9/2020 | Lancelle | A61C 13/34 |
| 11,185,394 | B2* | 11/2021 | Nikolskiy | A61C 13/0004 |
| 2002/0110786 | A1* | 8/2002 | Dillier | A61C 13/0004 |
| | | | | 433/213 |
| 2009/0092946 | A1 | 4/2009 | Yau | |

OTHER PUBLICATIONS

Han, J., et al. "Digitized Occlusal Reconstruction for Dental Prostheses" IEEE 2nd Int'l Conf. on Mechanic Automation & Control Engineering, pp. 7307-7310 (2011) available from <https://ieeexplore.IEEE.org/document/5988736> (Year: 2011).*

Yuan, F., et al. "Computer-Aided of Tooth Preparations for Automated Development of Fixed Prosthodontics" Computers in Biology & Medicine, vol. 44, pp. 10-14(2014) (Year: 2014).*

International Search Report; PCT/US2019/034844; Aug. 5, 2019 (completed); dated Aug. 13, 2019 (mailed).

Written Opinion of the International Searching Authority; PCT/US2019/034844; dated Aug. 5, 2019 (completed); Aug. 13, 2019 (mailed).

International Preliminary Report on Patentability; PCT/US2019/034844; Aug. 5, 2019 (completed); dated Aug. 13, 2019 (mailed).

* cited by examiner

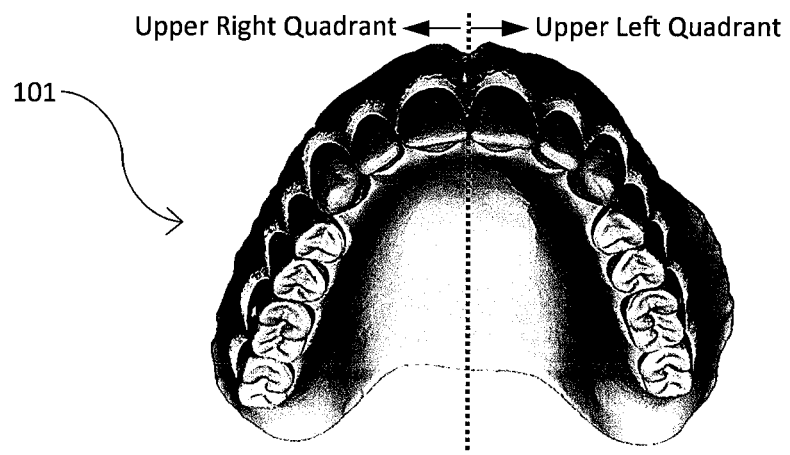
FIG. 1
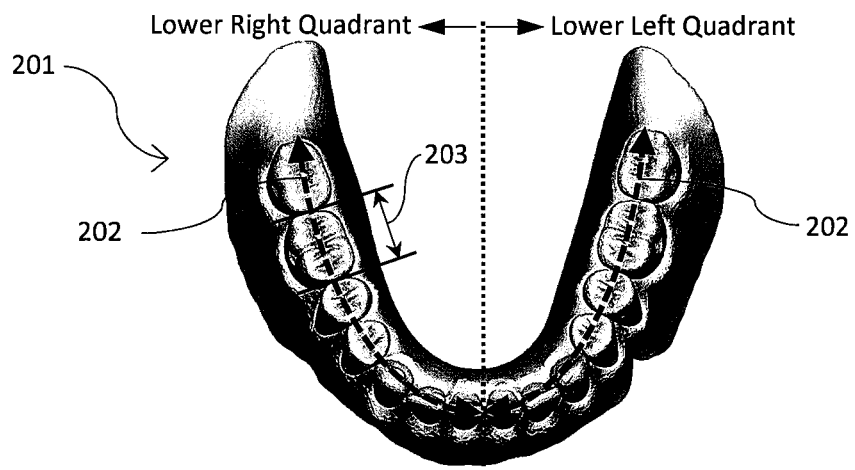
FIG. 2
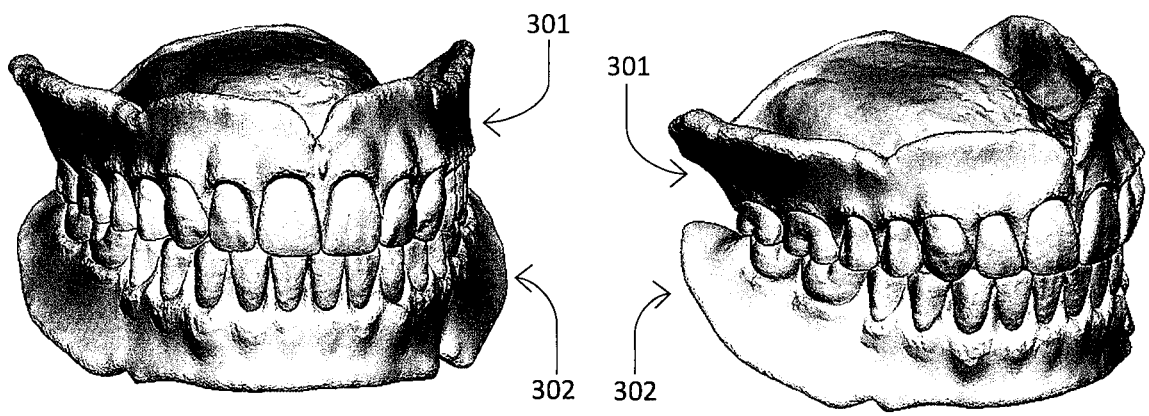
FIG. 3A
FIG. 3B

METHODS OF DIGITALLY DESIGNING ARTIFICIAL TEETH

CROSS-REFERENCE TO RELATED APPLICATIONS

This application claims the benefit of and priority to U.S. Provisional Application No. 62/679,093 filed Jun. 1, 2018, which is herein incorporated by reference for all purposes.

FIELD OF THE INVENTION

The present invention relates to methods for digitally designing artificial teeth for use in a dental prosthesis and/or dental restoration. More particularly, the invention relates to digitally designing posterior artificial teeth for use in a dental prosthesis and/or dental restoration by digitally modifying the occlusal surface of reference posterior tooth forms.

BACKGROUND

In the field of prosthodontics, the set-up of artificial teeth within a denture base is not a trivial task. It requires a skilled technician with an in-depth knowledge of the entire denture fabrication process, tooth design (widths and lengths), occlusal angles, and overall tooth placement schemes. Issues with denture locking during normal wear, poor balanced articulation, improper vertical tooth placement, and generally overall poor fit are common issues with artificial tooth placement. Frequently, the teeth need to be ground to improve fit to avoid these common issues. It is not uncommon for a patient to visit his primary dentist numerous times before a good fit is established.

One of the key issues or shortcomings with current artificial teeth is the loss of aesthetics when compared to natural teeth. This may be particularly noticeable as a less natural-looking tooth color and/or translucency/opalescence, and/or less natural-looking shape or morphological features of the occlusal surface (chewing surface of the tooth). In addition to the loss of aesthetics, the shape or morphological character of the occlusal surface can also contribute to a lack of function and/or stability of a denture in use, especially within the context of utilizing various currently available tooth occlusal angles and occlusal schemes. For full and partial dentures, the set-up of the upper (maxillary) and lower (mandibular) dentures is one of the key considerations to the success of a denture. Edentulous patients seek denture treatment to restore function and aesthetics in the most comfortable fashion. While complete dentures greatly improve the lifestyle of edentulous patients, an ill-fitting or poorly functioning denture dramatically reduces the patient's quality of life.

The set-up of teeth within a denture base may be performed using a variety of occlusal schemes. The occlusal scheme is defined as the form and organization of contact between the opposing contacting teeth in natural and artificial dentition. The pattern and location of the contacts over the mandibular/maxillary occlusal surfaces are governed by the nature of the occlusal schemes. Over the years, several different occlusal schemes were developed for complete dentures and/or overdentures.

The concept of 'occlusal angle' to describe teeth for various denture setups has been commonly used in dentistry. For full dentures, a variety of 'occlusal angles' are offered for posterior teeth. These angles typically range from 0° to 40°, and loosely translate to the angle formed between the cusp tip and the central groove of a posterior tooth when viewed in the mesio-distal direction of the tooth form. However, it has been observed that for such an irregular organic shape, a variety of angles could be defined for any given cross-section of a posterior tooth. This ambiguity makes 'occlusal angle' a poor measure of teeth profiles for various functional setups, and can lead to more trial and error effort in achieving the desired occlusal scheme for a patient.

Many commercially available artificial posterior teeth shapes have been created based on the design skills of master artisans working within a real, tangible/physical process. A skilled artisan painstakingly prepares and refines detailed physical carvings to sculpt a variety of physical model tooth forms conforming to some pre-determined range of occlusal angles (e.g., 0°, 10°, 20°, and 30°). These hand-crafted physical model tooth forms then become the basis for establishing 'production master' tooth form molds to be used in mass production of artificial teeth supplied to dental prosthesis fabricators. Relying on this hand-crafted process, however, has significant disadvantages and drawbacks. Chiefly among these is the profound investment of time and labor required to create, individually by hand, such an extensive range of individual physical tooth forms necessary to accommodate needs of a diverse patient population. Multiple sets, or families, of posterior teeth (four sets having two molars and two premolars each, to fulfill the four quadrants of combined upper and lower dental arches), each possessing its own specific occlusal shape/structure must be crafted to both look and function in a complementary and harmonious manner with the other. Moreover, this process must be repeated not only to provide distinct sets, or families, across a series of different pre-determined occlusal angles, but also across a series of different tooth widths/sizes. This is necessary in order to effectively meet the diversity of functional set-up characteristics encountered in the patient population. Thus, this physical process of establishing new tooth forms that are both aesthetically pleasing and able to function effectively and reliably in different occlusal schemes is currently very laborious and costly, while requiring a highly-specialized set of skills and experience.

Therefore, there is a need for improved methods of designing natural-looking, functional artificial teeth for use in dental prostheses. In particular, there is a need for more efficient and consistent methods, based on digital technologies, for designing the occlusal surface of posterior artificial teeth that provide effective, consistent functional set-up and performance, especially across a variety of occlusal schemes, in the preparation of dental prostheses.

SUMMARY

Disclosed are methods of digitally designing artificial teeth for use in a dental prosthesis and/or dental restoration, such as partial and full dentures, that satisfy these and other needs. The present disclosure provides for methods of digitally designing teeth, using computer-aided design, starting from reference dentition articulated in a predetermined occlusal scheme.

A method of digitally designing posterior artificial teeth for use in a dental prosthesis and/or dental restoration may comprise the steps of: (a) providing a three-dimensional (3D) digital model of a dentition model having a maxillary dentulous arch form and a mandibular dentulous arch form, each of the maxillary and the mandibular dentulous arch forms include a plurality of reference anterior tooth forms and a plurality of reference posterior tooth forms, wherein both the maxillary and the mandibular dentulous arch forms are disposed in an opposing relation to one another so that a predetermined occlusal scheme and intercuspation of the dentition model is effectively created; (b) identifying an occlusal surface and a sub-occlusal surface for each reference posterior tooth form of the 3D digital model, wherein the occlusal surface is characterized by a non-zero occlusal depth of no more than about 5 mm; (c) modifying an initial reference posterior tooth form that is selected within one of the dentulous arch forms of the 3D digital model, wherein modifying an initial reference posterior tooth form comprises the steps of: (i) ascertaining an initial reference occlusal depth ($OD_{Ref}$) for the initial reference posterior tooth form; and (ii) modifying geometry of the occlusal surface of the initial posterior tooth form by adjusting the initial reference occlusal depth ($OD_{Ref}$) to a different target occlusal depth ($OD_{Target}$), while allowing the sub-occlusal surface of the initial reference posterior tooth form to remain substantially unchanged; (d) modifying each neighboring reference posterior tooth form, located within the same quadrant of the dentulous arch form of the 3D digital model as the initial reference posterior tooth form, wherein modifying each neighboring reference posterior tooth form comprises the steps of: (i) ascertaining the occlusal depth for each neighboring reference posterior tooth form; and (ii) modifying geometry of the occlusal surface of each neighboring reference posterior tooth form by adjusting the occlusal depth to conform to substantially the same ratio of target occlusal depth to initial reference occlusal depth ($OD_{Target}/OD_{Ref}$) established by the initial reference posterior tooth form; and (e) modifying each opposing reference posterior tooth form, located within the opposing quadrant of the dentulous arch form disposed in opposing relation to the initial reference posterior tooth form of the 3D digital model, wherein modifying each opposing reference posterior tooth form comprises the steps of: (i) ascertaining the occlusal depth for each opposing reference posterior tooth form; and (ii) modifying geometry of the occlusal surface of each opposing reference posterior tooth form by adjusting the occlusal depth to conform to substantially the same ratio of target occlusal depth to initial reference occlusal depth ($OD_{Target}/OD_{Ref}$) established by the initial reference posterior tooth form.

Providing a pre-determined occlusal scheme for the 3D digital model may comprise physically arranging the maxillary dentulous arch form and the mandibular dentulous arch form in a mechanical adjustable dental articulator. Alternatively, providing a predetermined occlusal scheme for the 3D digital model may comprise digitally arranging the maxillary dentulous arch form and the mandibular dentulous arch form in a virtual adjustable dental articulator. A predetermined occlusal scheme may be selected from lingualized occlusion, balanced occlusion, linear occlusion, and combinations thereof.

In one embodiment, methods of the present disclosure may further comprise the step of modifying each remaining reference posterior tooth form, located within the remaining quadrants of the maxillary and mandibular dentulous arch forms, wherein modifying each remaining reference posterior tooth form comprises the steps of: (a) ascertaining the occlusal depth for each remaining reference posterior tooth form; and (b) modifying geometry of the occlusal surface of each remaining reference posterior tooth form by adjusting the occlusal depth to conform to substantially the same ratio of target occlusal depth to initial reference occlusal depth ($OD_{Target}/OD_{Ref}$) established by the initial reference posterior tooth form.

In one aspect of the present disclosure, the step of modifying geometry of the occlusal surface of reference posterior tooth forms may be further characterized by repositioning a plurality of digital points, non-uniform rational basis spline (NURBS) surfaces, and/or subdivision (sub-D) surfaces that define a plurality of cusp positions and groove positions within the occlusal surface.

In another aspect of the present disclosure, a reduction of the initial reference occlusal depth ($OD_{Ref}$) to a lesser target occlusal depth ($OD_{Target}$) may be achieved by contracting the cusp positions in the corono-apical direction by about 50 percent of the difference between the initial reference occlusal depth and the target occlusal depth ($OD_{Ref}-OD_{Target}$), and diminishing the groove positions in the corono-apical direction by about 50 percent of the difference between the initial reference occlusal depth and the target occlusal depth ($OD_{Ref}-OD_{Target}$).

In another aspect of the present disclosure, an increase of the initial reference occlusal depth ($OD_{Ref}$) to a target occlusal depth ($OD_{Target}$) may be achieved by expanding the cusp positions in the corono-apical direction by about 50 percent of the difference between the target occlusal depth and the reference occlusal depth ($OD_{Target}-OD_{Ref}$), and deepening the groove positions in the corono-apical direction by about 50 percent of the difference between the target occlusal depth and the initial reference occlusal depth ($OD_{Target}-OD_{Ref}$).

In another embodiment, methods of the present disclosure may further comprise the step of repositioning one or more cusp positions, or one or more groove positions, or both within the occlusal surface by: (a) generating and distributing a plurality of digital cross-sectional planes across each of the reference posterior tooth forms, wherein the digital cross-sectional planes are positioned orthogonally to the mesio-distal direction of the dentulous arch form; (b) inspecting the digital cross-sectional planes for the presence of intersections or contacts between the occlusal surfaces of opposing reference posterior tooth forms; and (c) diminishing one or more cusp positions, or one or more groove positions, or both in the corono-apical direction to reduce or remove intersections or contacts between occlusal surfaces of opposing reference posterior tooth forms, whereby the same occlusal scheme as the dentition model is maintained, and the interocclusal distance is maintained at substantially the same value as the dentition model.

In still another embodiment, methods of the present disclosure may further comprise the step of modifying the mesio-distal width of each reference posterior tooth form, wherein modifying the mesio-distal width of each reference posterior tooth form comprises the steps of: (a) ascertaining the mesio-distal width of each reference posterior tooth form; and (b) applying a predetermined scaling factor to adjust the mesio-distal width of each reference posterior tooth form to a predetermined tooth form size for patient-specific dental prosthesis needs.

BRIEF DESCRIPTION OF THE DRAWINGS

These and other features, aspects, exemplary embodiments, and advantages of the present invention will become better understood with regard to the following description, appended claims, and accompanying drawings where:

FIG. 1 shows an exemplary three-dimensional (3D) digital model of a dentition model representing a maxillary (upper) dentulous arch form;

FIG. 2 shows an exemplary three-dimensional (3D) digital model of a dentition model representing a mandibular (lower) dentulous arch form;

FIGS. 3A and 3B show different views of an exemplary 3D digital model of a dentition model representing a maxillary dentulous arch form and a mandibular dentulous arch form disposed in an opposing relation to one another to form a pre-determined occlusal scheme and intercuspation of the dentition;

DETAILED DESCRIPTION

Figure 4A:
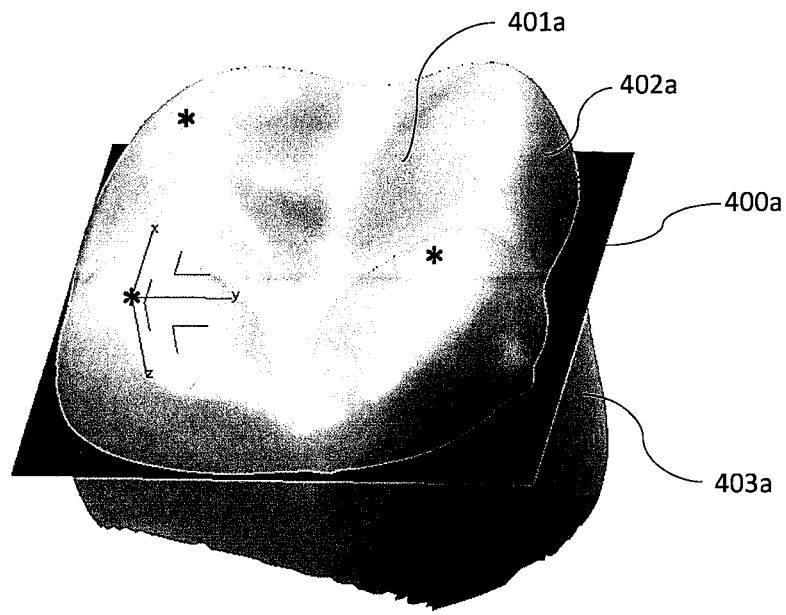
FIGS. 4A and 4B show an example 3D digital tooth form model of a molar tooth form and a premolar tooth form, respectively, where the occlusal surface and sub-occlusal surface are depicted.

In the Summary above, and in the Detailed Description and Claims presented below, along with the accompanying drawings, reference is made to particular features and embodiments of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). The following additional definitions shall apply throughout the specification and claims of the invention, unless specifically indicated otherwise.

The term "about" is used herein as a term of approximation to mean plus or minus 5 percent of the specified value, preferably plus or minus 3 percent of the specified value, more preferably plus or minus 1 percent of the specified value.

The terms "essentially" and "substantially" are used herein as terms of approximation to denote in large part, but not necessarily wholly or perfectly, in relation to the fundamental nature or predominant characteristic being described.

The term "at least" followed by a number is used herein to denote the start of a range beginning with that number (which may be a range having an upper limit or no upper limit, depending on the variable being defined). For example, "at least 1" means 1 or more than 1.

The terms "at most" or "no more than" followed by a number is used herein to denote the end of a range ending with that number (which may be a range having 1 or 0 as its lower limit, or a range having no lower limit, depending upon the variable being defined). For example, "at most 100" or "no more than 100" means 100 or less than 100. When, in this specification, a range is given as "(a first number) to (a second number)" or "(a first number)-(a second number)," this means a range whose lower limit is the first number and whose upper limit is the second number. For example, 1 to 5 mm means a range whose lower limit is 1 mm, and whose upper limit is 5 mm.

The term "and/or," as used herein, includes any and all possible combinations of one or more of the associated listed items, as well as the lack of combination when interpreted in the alternative ("or"). For example, "A and/or B" means A alone, B alone, or A and B together or mixtures thereof.

Directional or spatially relative terms, such as "under," "below," "beneath," "lower," "over," "upper," "above," "on top," "left," "right," and the like, may be used herein for ease of description to describe the relationship of an element or feature to other element(s) or feature(s) illustrated in the figures. It will be understood that the spatially relative terms are intended to encompass different orientations of the device in addition to the orientations depicted in the figures. For example, if the device in the figures were to be inverted, elements or features described as "above" or "on top" other elements or features would then be oriented "below" or "under" the other elements or features. The device may be otherwise oriented (e.g., rotated at 90 degrees or other orientations) and the spatially relative descriptors used herein interpreted accordingly. Similarly, the terms "upward," "downward," "vertical," "horizontal" and the like are used herein for the purpose of relative explanation only, unless specifically indicated otherwise.

The term "anatomic tooth" (and "anatomic teeth") refers to a tooth (teeth) form that substantially duplicates or resembles the anatomic shape and/or morphological features, particularly with respect to the occlusal surface, of a natural tooth (teeth) for a given tooth type. An anatomic tooth has a substantial cusp height or length for intercuspation with opposing teeth, as well as cuspal prominences and inclinations (e.g., typically about 30° or more of cuspal inclination) on the occlusal surface that are characteristic to a slightly to moderately worn natural tooth.

The term "semi-anatomic tooth" (and "semi-anatomic teeth") refers to a tooth (teeth) form that has some characteristics like those of the anatomic tooth (teeth), having cusp height or length for intercuspation with opposing teeth, but with smaller cuspal prominences and inclinations (e.g., about 20° or less of cuspal inclination) on the occlusal surface that are also similarly characteristic to a natural tooth.

The term "non-anatomic tooth" (and "non-anatomic teeth") refers to a tooth (teeth) form that lack the anatomic shape and/or morphological features, particularly with respect to the occlusal surface, of a natural tooth (teeth) for a given tooth type. A non-anatomic tooth is essentially flat (i.e., also referred to as zero-degree or cuspless) having substantially flat ridges with no cusp height for intercuspation with opposing teeth, lacking the cuspal prominences and inclinations on the occlusal surface that are characteristic to a natural tooth.

The term "occlusal surface" of a tooth, in the context of the present invention, refers to the upper surface areas of a tooth used for chewing (masticating) or grinding. It is the upper surface of a tooth that occludes with and either comes in contact, or near contact, with a similar surface of one or more opposing teeth in the opposing jaw. As used herein, it should be understood to include both the inner aspect areas (401a, 401b) of the grooves and inner cusp inclines, as well as outer aspect areas (402a, 402b) of the outer cusp inclines of the upper surface, as both the inner and outer aspect areas contribute to functional set-up and chewing/grinding performance.

The term "sub-occlusal surface" of a tooth (403a, 403b), in the context of the present invention, refers to the surface of a tooth immediately adjacent and below the "occlusal surface" of a tooth.

The term "mesio-distal width" of a tooth (203) refers to the width or diameter of a tooth form as measured across the mesio-distal direction (202) of the dentulous arch form.

The term "interocclusal distance" refers to the distance between the occlusal surfaces of opposing maxillary and mandibular teeth when the maxillary dentulous arch form and mandibular dentulous arch form are in opposing relation to one another to form a predetermined occlusal scheme.

Providing 3D Digital Model of a Dentition Model

In the present invention, it is advantageous to establish an appropriate initial reference model for a set of dentulous arches, possessing desirable aesthetic and functional morphological characteristics and arrangement of the teeth. Thus, providing or obtaining an accurate three-dimensional (3D) digital model of a dentition model having representations of a maxillary (upper) dentulous arch form (101), as shown in FIG. 1, and a mandibular (lower) dentulous arch form (201), as shown in FIG. 2, may be established in a first aspect of the invention.

Various known imaging or scanning systems and methods (e.g., laser optical scanners, computed tomography (CT) scanners) are available to obtain accurate 3D digital models of dental arches and dentition. In one embodiment of the invention, a 3D digital model may be obtained from scanning a physical model (e.g., cast forms of dental impressions) of reference arch forms having natural teeth possessing desirable aesthetics and functional morphological characteristics. In an alternative embodiment, a 3D digital model may be obtained from scanning a physical model of reference arch forms having artificial teeth possessing desirable aesthetics and functional morphological characteristics. In yet another alternative embodiment, depending on the specific technique and system selected, it even may be possible to obtain an appropriate 3D digital model directly from an intra-oral or extra-oral scan of a reference patient's arches and dentition.

The imaging or scanning that provides a corresponding digital reference model may be accomplished by a skilled technician using one or more approaches. In one approach, a skilled technician may use a physical dental articulator "set-up" of physical dentulous arch models in a selected or predetermined occlusal scheme to effectively create the reference occlusion and intercuspation of teeth, followed by scanning of this set-up, as well as scanning of the individual dentulous arch forms. Software may then be used to digitally align individual dentulous arch form images with the image of the complete physical set-up. In another approach, a skilled technician may scan/image individual dentulous arches and/or individual teeth separately without physical "set-up." Having obtained these scans/images, the technician can then use software with a virtual dental articulator in a virtual environment to configure and align the various elements of the virtual models in a selected or predetermined occlusal scheme to effectively create the reference occlusion and intercuspation of teeth. To facilitate creation of a predetermined occlusal scheme for the reference dentition model, it is known in the art for a skilled technician to use an adjustable dental articulator to establish an occlusion configuration between maxillary and mandibular dentulous arch forms. An adjustable dental articulator is a mechanical device (or virtual representation of one if used in a virtual environment) with upper and lower components to which maxillary and mandibular casts may be attached. The dental articulator is intended to reproduce the static relationship of a patient's maxilla to mandible (in intercuspal or retruded contact positions [RCPs]), and may also provide to a limited extent for lateral and protrusive movements. Articulators are used to study individual teeth and full dental arches for diagnosis and treatment planning, and allow adjustment of fixed and removable prostheses and indirect dental restorations.

As a general consideration in the design of dental prostheses, anatomic and/or semi-anatomic teeth forms are preferable over non-anatomic (flat) teeth forms. Anatomic and/or semi-anatomic teeth forms are generally perceived to be superior, due to their enhanced aesthetics and effect on masticatory ability, in both subjective and objective evaluations by patients and dentists. FIG. 3A and FIG. 3B show different perspective views of an exemplary 3D digital model of a dentition model having anatomic teeth forms, where the maxillary dentulous arch form (301) and the mandibular dentulous arch form (302) are set in opposing relation to one another in a predetermined occlusal scheme with intercuspation of the teeth.

One of the principle considerations for denture success is occlusion. In particular, it has been established in the field of prosthodontics that dentures exhibit different biomechanical characteristics than natural teeth. The denture acts as one unit, and any force applied to a single denture tooth will be directly transferred to the rest of the denture. To overcome this limitation, several occlusal concepts for dentures have emerged over the years. Altering the posterior tooth occlusal surface shape and occlusal scheme can impact the lateral forces on the denture and residual ridge of a patient's jaw. And although dentures have been used in prosthodontics for centuries, a lack of compelling evidence supporting any one occlusal scheme remains to this day.

Occlusal scheme is defined as the form and the arrangement of the occlusal contacts in natural and artificial dentition. The choice of an occlusal scheme determines the pattern of occlusal contacts between opposing teeth during centric relation and functional movement of the mandible. With dentures, the quantity and the intensity of these contacts determine the amount and the direction of the forces that are transmitted through the bases of the denture to the residual ridges. Consequently, the occlusal scheme is an important factor in the design of dentures. Among the more commonly accepted occlusal schemes for preparing dental prostheses and/or restorations are the so-called lingualized occlusion, balanced occlusion, and linear occlusion schemes. It is believed that there may not be one general occlusal scheme that fits all patients in need of dentures, and, in many cases, more than one occlusal scheme may be adequate. A skilled dentist and dental technician may decide on the most suitable occlusal scheme for an individual patient's needs, and having artificial teeth designed to be versatile and easily accommodate the various commonly known occlusal schemes is highly desirable.

In one embodiment, artificial teeth designed by methods of the invention may be designed for optimal denture set-up and function in a specific occlusal scheme (e.g., lingualized occlusion only, or balanced occlusion only). In a preferred embodiment, artificial teeth may be designed for permitting an efficient, more versatile denture set-up and function in two or more occlusal schemes (e.g., lingualized and balanced occlusion; lingualized, balanced, and linear occlusion).

Modifying 3D Digital Model in Computer-Aided Software

Having obtained or prepared a 3D digital model of a dentition model (with a predefined set-up and/or occlusal scheme), computer-aided design (CAD) software well-known in the art may then be used to edit and modify the 3D digital model. More specifically, CAD software may be used to quickly edit and modify shape and/or contours of the occlusal surface of posterior tooth forms in the 3D digital model. Thus, the design of artificial tooth forms having improved occlusal set-up characteristics can be refined in a more consistent, reliable, and efficient manner in a 3D digital environment, compared to conventional physical modification techniques on physical models. Additionally, in an optional manner, CAD software may be used further to edit and modify mesio-distal width of posterior tooth forms, while maintaining integrity of occlusal surfaces, for the design of improved artificial tooth forms. Modifying mesio-distal width of posterior tooth forms can be advantageous for manufacturing a variety of tooth sizes to accommodate a more comprehensive range of sizes for dental prostheses suitable for a broader population of patients.

Figure 4B:
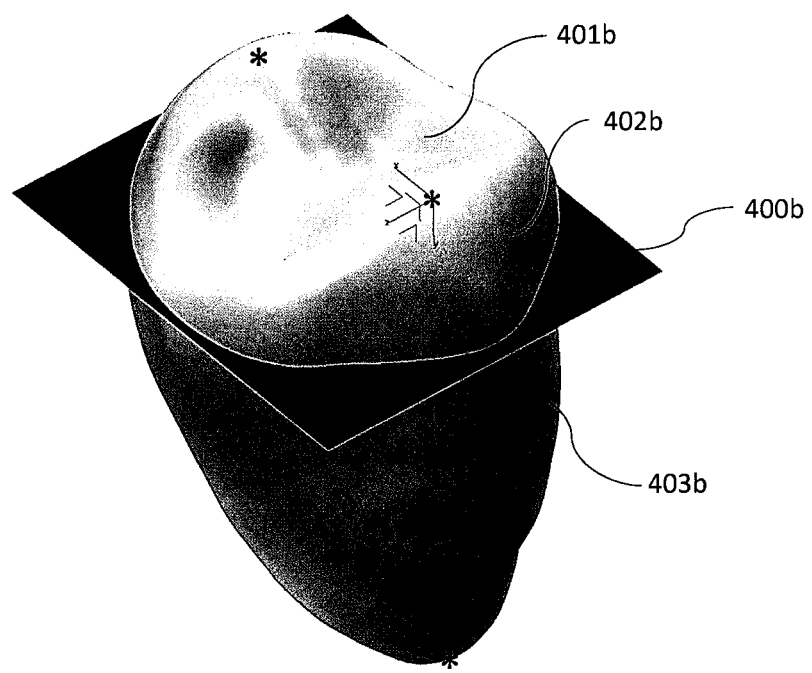

As shown in FIGS. 4A and 4B for an exemplary molar and premolar tooth form model, respectively, CAD software may be used with the 3D digital models to establish an "occlusal surface" (401a, 402a, 401b, 402b surfaces above the "occlusal intersecting plane" (400a, 400b)) and a "sub-occlusal surface" (403a, 403b surfaces below the "occlusal intersecting plane") for each reference posterior tooth form of the 3D digital model. The occlusal surface of each reference posterior tooth form has a non-zero "occlusal depth" of no more than about 5 mm, as determined by the "occlusal depth" measurement technique described herein below. Preferably, the occlusal depth may be greater than 0 mm and no more than about 4 mm.

Occlusal Depth

To overcome or avoid the prior mentioned current ambiguity or inexactness associated with determining 'occlusal angle' of posterior teeth forms, a more precise digital solution for characterizing the occlusal surface profiles based on "occlusal depth" has been developed in the present invention.

Figure 5A:
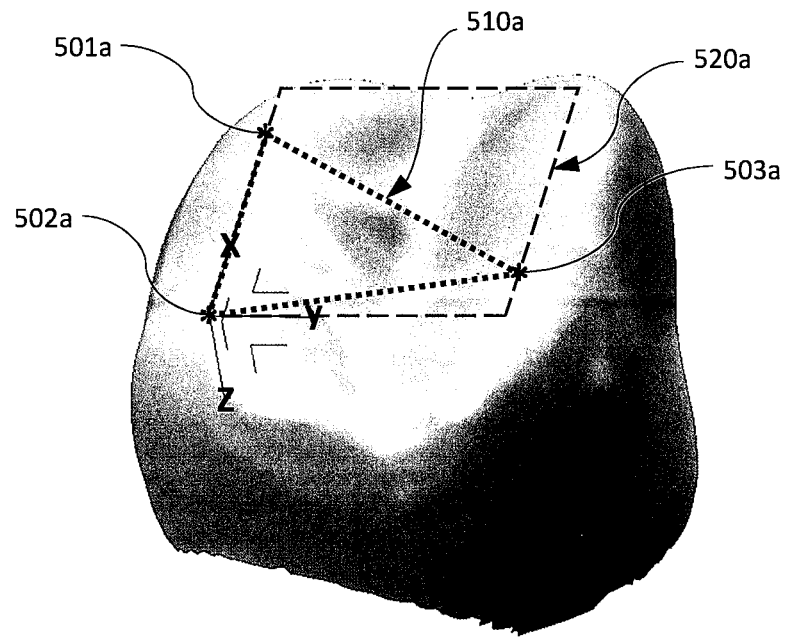
FIGS. 5A and 5B show an example 3D digital tooth form model of a molar tooth form and a premolar tooth form, respectively, where the reference points used in the process of establishing an occlusal cusp plane and a Cartesian (x-y-z) coordinate axis system are depicted.
Figure 5B:
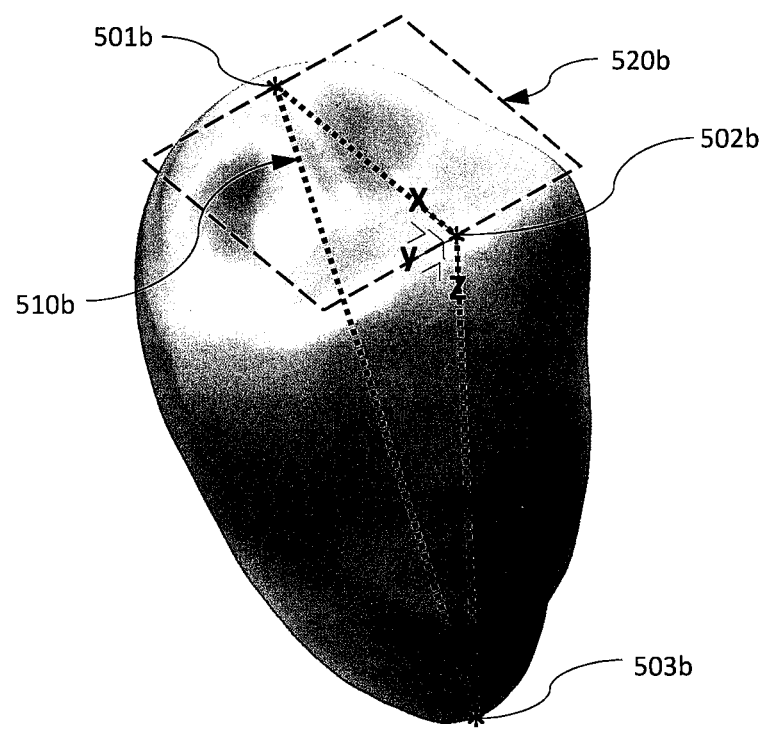

Values for "occlusal depth" of posterior tooth forms may be established using a digital measurement technique on 3D digital model files (e.g., STL, STEP, IGES) with CAD software. FIG. 5A and FIG. 5B show an example 3D digital tooth form model of a molar and a premolar, respectively. "Occlusal depth" for molar and premolar tooth forms may be determined according to at least one of the procedures outlined below.

For posterior tooth forms having at least three cusps (i.e., molar type teeth), each of the cuspal prominences may be inspected, visually and/or algorithmically, to identify three cusps having the three highest cusp points or peaks on the occlusal surface (as shown by marked points 501a, 502a, and 503a in FIG. 5A). These cusp points may be defined at the local maximum or apex (i.e., highest location point in z-direction of FIG. 5A) on individual cusps of a digital tooth form model. To facilitate identification and selection of cusp points at the highest location, it may be advantageous to inspect the digital tooth form model (particularly by zooming in to view an image at a closer scale) from both the mesio-distal direction (the x-axis direction in FIG. 5A) and bucco-lingual direction (the y-axis direction in FIG. 5A). If a cusp point is initially determined from the corono-apical directional view (i.e., viewing from the top perspective or z-axis view in FIG. 5A), this may result in the cusp point being set less accurately at a slight offset from the true apex. In this scenario, the cusp point can then be repositioned more accurately by inspecting the digital tooth form model from the other two directions. These three highest cusp points or peaks may be used to define an orientation plane (510a) at the top of the occlusal surface. With this orientation plane established, it then follows that an "occlusal cusp plane" (520a) and a Cartesian (x-y-z) coordinate axis system (as shown by axis system at marked point 502a in FIG. 5A) may be established and aligned with this orientation plane for the digital tooth form model. To facilitate the process of determining "occlusal depth" for a tooth form, the x-y-z coordinate axis system may be registered with the tooth form so that a plane of the x-y-z coordinate axis system (e.g., the x-y plane as shown in FIG. 5A) is aligned in the same plane with the "occlusal cusp plane" (520a). By aligning a plane of the x-y-z coordinate axis system in the same plane with the "occlusal cusp plane," one axis can then be in a perpendicular orientation to the "occlusal cusp plane" of the tooth form (as shown by the z-axis in FIG. 5A). This perpendicular axis, herein after referred to as the "occlusal depth axis," can facilitate additional utilization of the digital model in determining the "occlusal depth," which is described in a later aspect below.

For posterior tooth forms having only two cusps (i.e., premolar type teeth), an alternative approach may be applied to establish an "occlusal cusp plane" and a Cartesian (x-y-z) coordinate axis system for this digital tooth form model. In this case, each of the cuspal prominences may be inspected, visually and/or algorithmically, to identify the highest cusp points or peaks for each of the cuspal prominences of the occlusal surface (as shown by marked points 501b and 502b in FIG. 5B). A third point, located at the extremum at the bottom of tooth form (as shown by marked point 503b in FIG. 5B), may be identified and used to define an orientation plane (510b). In this case, the orientation plane (510b) is defined in a position perpendicular to the top of the occlusal surface. Thus, with this orientation plane established, it then follows that an "occlusal cusp plane" (520b) and a Cartesian (x-y-z) coordinate axis system (as shown by axis system at marked point 502b in FIG. 5B) may be established relative to this orientation plane for the digital tooth form model. More specifically, here the "occlusal cusp plane" (520b) can be established at the highest cusp points previously identified (points 501b and 502b) by positioning the "occlusal cusp plane" perpendicular to the orientation plane (510b). Moreover, the x-y-z coordinate axis system may be registered with the tooth form so that it is aligned in the same plane with the "occlusal cusp plane" (520b). By aligning a plane of the x-y-z coordinate axis system in the same plane with the "occlusal cusp plane," one axis can then be in a perpendicular orientation to the "occlusal cusp plane" of the tooth form (as shown by the z-axis in FIG. 5B). This perpendicular axis, herein after also referred to as the "occlusal depth axis," can facilitate additional utilization of the digital model in determining the "occlusal depth," which is described in a later aspect below.

Figure 6:
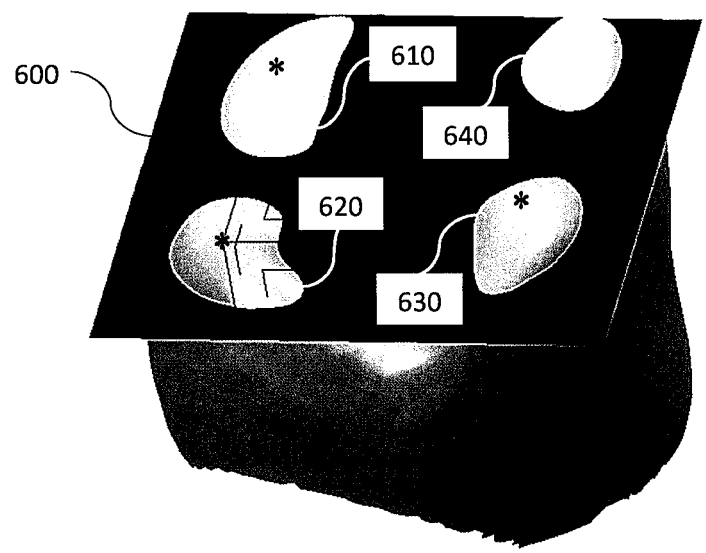
FIG. 6 shows a view of occlusal intersection curves on an exemplary molar tooth form model, generated by increasing the offset distance (i.e., into the tooth form) of the occlusal intersecting plane relative to the occlusal cusp plane.
Figure 8A:
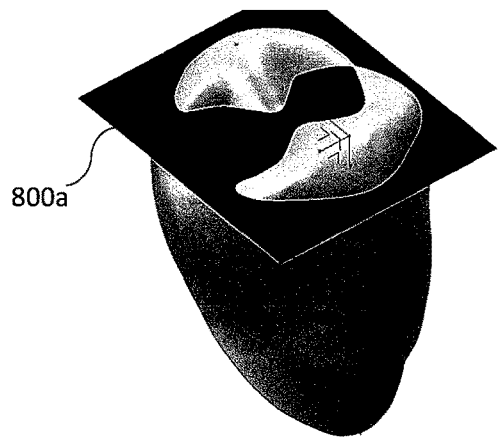
FIG. 8A-8C provide a progression of images showing the change in occlusal intersection curves as the depth of the occlusal intersecting plane increases in the direction of the occlusal surface for an exemplary premolar tooth form.
Figure 8B:
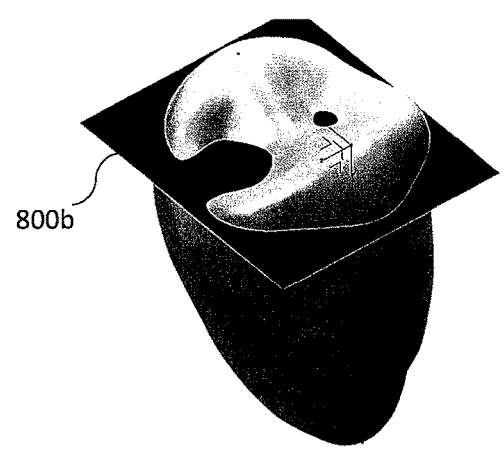

Having established an x-y-z coordinate axis system aligned with the "occlusal cusp plane" (520a and 520b), an "occlusal intersecting plane" (not displayed in FIG. 5A or 5B) also then may be initially established and aligned in the same plane with the "occlusal cusp plane." Once established and aligned, this "occlusal intersecting plane" may be digitally offset from the "occlusal cusp plane" in a perpendicular manner along the "occlusal depth axis," away from the cusp points in the direction of the sub-occlusal surface of the tooth form. FIG. 6 shows an exemplary image of an "occlusal intersecting plane" (600) at an arbitrary offset distance from the "occlusal cusp plane" along the "occlusal depth axis." As the offset distance of the "occlusal intersecting plane" (600) is increased in the direction of the sub-occlusal surface of the tooth form (i.e., into the tooth form), one or more "occlusal intersection curves" are produced (610, 620, 630, and 640). An "occlusal intersection curve" outlines an occlusal surface contour at a given offset distance of the "occlusal intersecting plane." In FIG. 6, "occlusal intersection curves" can be observed around each of the cusp locations on the occlusal surface. In some circumstances, depending on the specific nature of geometrical contours of the occlusal surface, as the offset distance of the "occlusal intersecting plane" is increased in the direction of the sub-occlusal surface of the tooth form, a plurality of "occlusal intersection curves" may be produced. In other circumstances, as the offset distance of the "occlusal intersecting plane" is increased in the direction of the sub-occlusal surface of the tooth form, only one "occlusal intersection curve" may be observed.

Figure 7A:
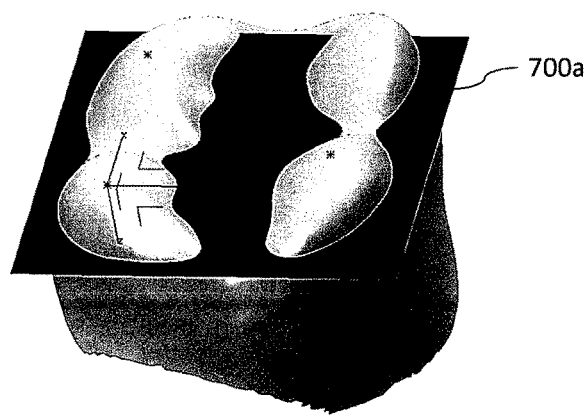
FIG. 7A-7C provide a progression of images showing the change in occlusal intersection curves as the depth of the occlusal intersecting plane increases in the direction of the occlusal surface for an exemplary molar tooth form.
Figure 7B:
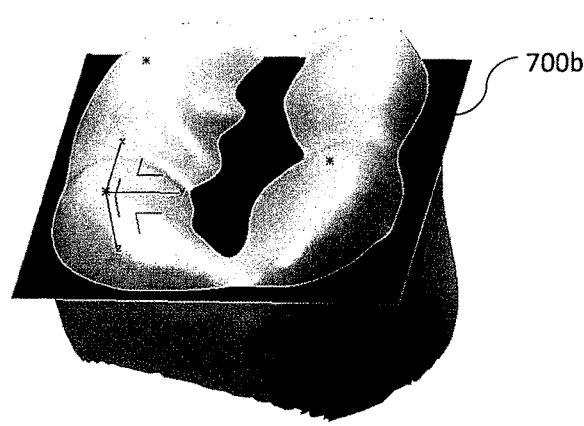
Figure 7C:
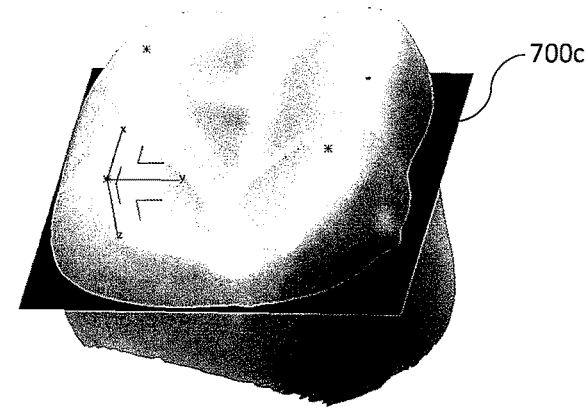
Figure 8C:
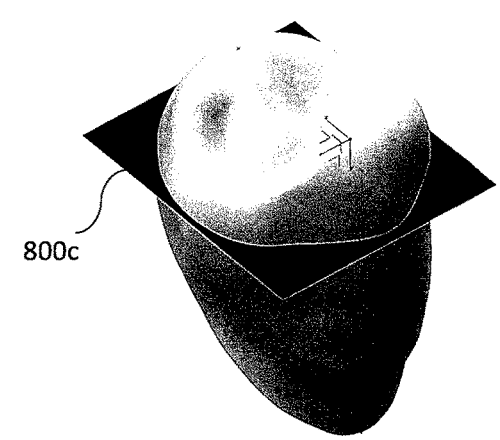

By progressively increasing the offset distance of the "occlusal intersecting plane" along the "occlusal depth axis" in the direction of the sub-occlusal surface, one or more "occlusal intersection curves" may be observed on the tooth form model at a given depth or distance. FIG. 7A-7C and FIG. 8A-8C demonstrate progressions of exemplary images showing the change in "occlusal intersection curves" as the depth of the "occlusal intersecting plane" (700a, 700b, 700c; 800a, 800b, 800c) changes moving in the direction of the sub-occlusal surface. An "occlusal depth" may be defined by the distance of the "occlusal intersecting plane" from the "occlusal cusp plane" at which all sections or areas of "occlusal intersection curve" within the ridges and/or grooves of the occlusal surface first disappear (i.e., no longer visible), such as shown in FIG. 7C and FIG. 8C. Thus, "occlusal depth" should correspond to the deepest or lowest point within the inner aspect areas of the grooves or sulci of a tooth.

In one preferred embodiment, the accuracy of "occlusal depth" may be suitably established in units of millimeters (mm), expressed to a degree of precision of at least two significant digits (e.g., 3.5 mm; 0.90 mm). Alternatively, the accuracy of "occlusal depth" may be suitably established in equivalent units of micrometers ($\mu$m), expressed to a degree of precision of at least two significant digits (e.g., $3.5 \times 10^3$ $\mu$m; $0.90 \times 10^3$ $\mu$m). In a more preferred embodiment, the accuracy of "occlusal depth" may be suitably established in units of millimeters (mm), expressed to a degree of precision of at least three significant digits (e.g., 3.53 mm; 0.896 mm). Alternatively, the accuracy of "occlusal depth" may be suitably established in equivalent units of micrometers ($\mu$m), expressed to a degree of precision of at least three significant digits (e.g., $3.53 \times 10^3$ $\mu$m; $0.896 \times 10^3$ $\mu$m).

Figure 9:
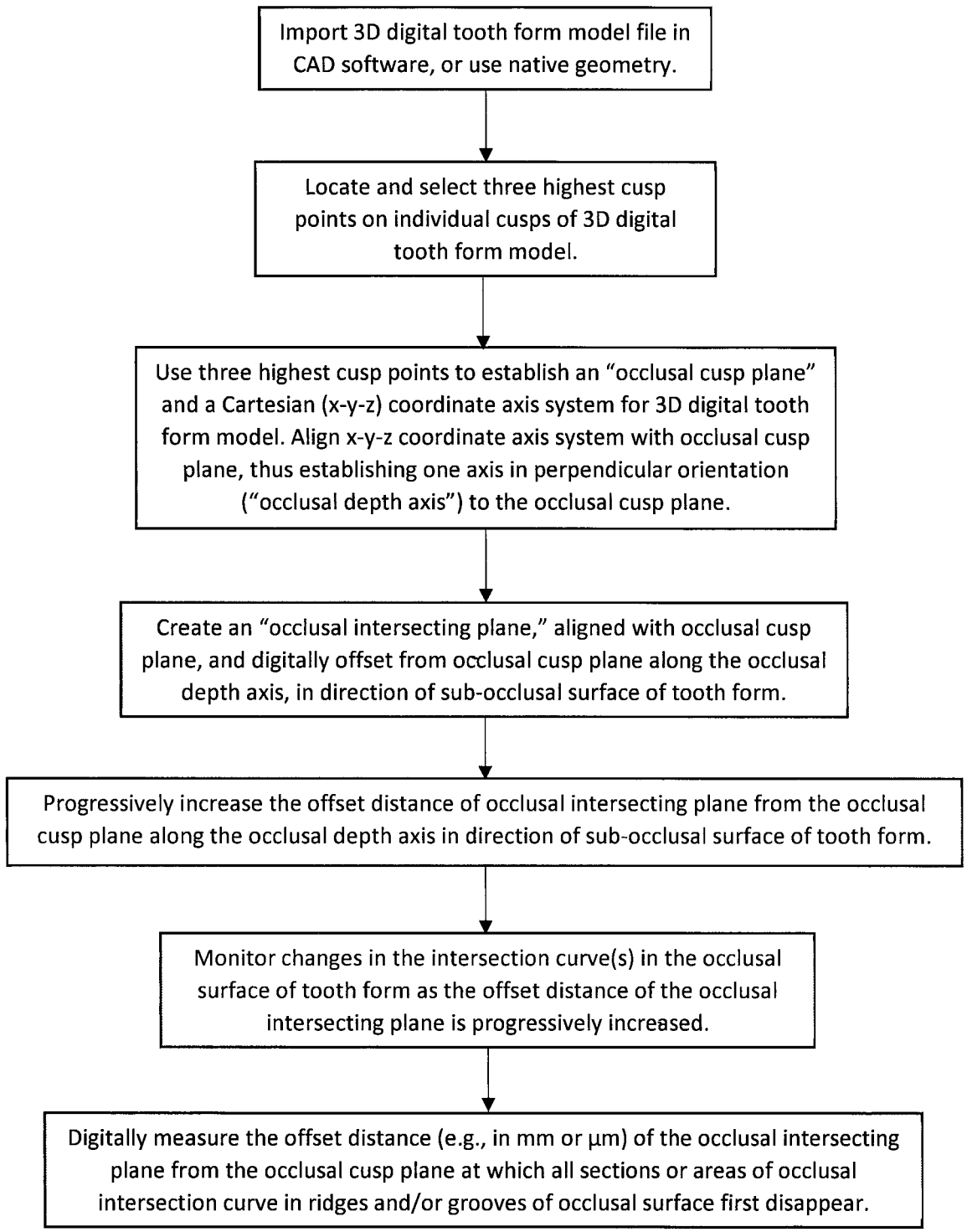
FIG. 9 shows a flow chart outlining steps in the process for establishing occlusal depth of posterior tooth forms having at least three cusps (i.e., molars)

FIG. 9 shows a flow chart outlining or summarizing steps in the process for establishing occlusal depth of posterior tooth forms having at least three cusps (i.e., molars).

Modifying Geometry of Occlusal Surfaces/Occlusal Depth

Within one of the dentulous arch forms (either maxillary or mandibular) of the 3D digital model, an initial reference posterior tooth form (either a premolar or molar tooth form) may be selected. Using the digital measurement technique previously described, an initial reference occlusal depth ($OD_{Ref}$) may be determined for the selected initial reference posterior tooth form. In the same manner, initial reference occlusal depth for each of the other reference posterior tooth forms in the maxillary and mandibular dentulous arch forms may be determined.

Modifying geometry of the occlusal surface of an initial reference posterior tooth form may be performed digitally. More specifically, the initial reference occlusal depth ($OD_{Ref}$) may be digitally adjusted or altered to a substantially different desired target occlusal depth ($OD_{Target}$), while allowing the sub-occlusal surface of the reference posterior tooth form to remain substantially unchanged.

In a non-limiting manner, among the more common means for digitally modifying geometry of 3D surfaces in CAD software include Non-Uniform Rational Basis Spline (NURBS) modeling and Subdivision Surface modeling (also known as Sub-D modeling or HyperNURBS modeling). NURBS is a mathematical model commonly used in computer graphics for generating and representing curves and surfaces. It offers great flexibility and precision for handling both analytic (surfaces defined by common mathematical formulae) and modeled shapes. NURBS are commonly used in computer-aided design (CAD), manufacturing (CAM), and engineering (CAE), and are part of numerous industry wide standards, such as IGES, STEP, ACIS, and PHIGS. NURBS tools may also be found in various 3D modeling and animation software packages. They can be efficiently handled by computer programs, and yet allow for easy human interaction. NURBS surfaces are functions of two parameters mapping to a surface in three-dimensional space. The shape of the surface may be determined by control points. NURBS surfaces can represent, in a compact form, simple geometrical shapes. NURBS can accurately represent both standard geometric objects like lines, circles, ellipses, spheres, and tori, and free-form geometry like car bodies and human bodies. Subdivision Surface modeling is a modeling technique for making high-resolution models by manipulating a lower-resolution "cage" model, and using software to subdivide for a smoother surface. Subdividing increases the number of vertices on the model, making curves more rounded. A subdivision surface may be a method of representing a smooth surface by way of specifying a coarser, piecewise linear polygon mesh. The smooth surface can be calculated from the coarse mesh as the limit of recursive subdivision of each polygonal face into smaller faces that better approximate the smooth surface. Subdivision surfaces may be more effective for complex organic shapes because they reduce the number of control points twofold in comparison with the NURBS surfaces.

Figure 10A:
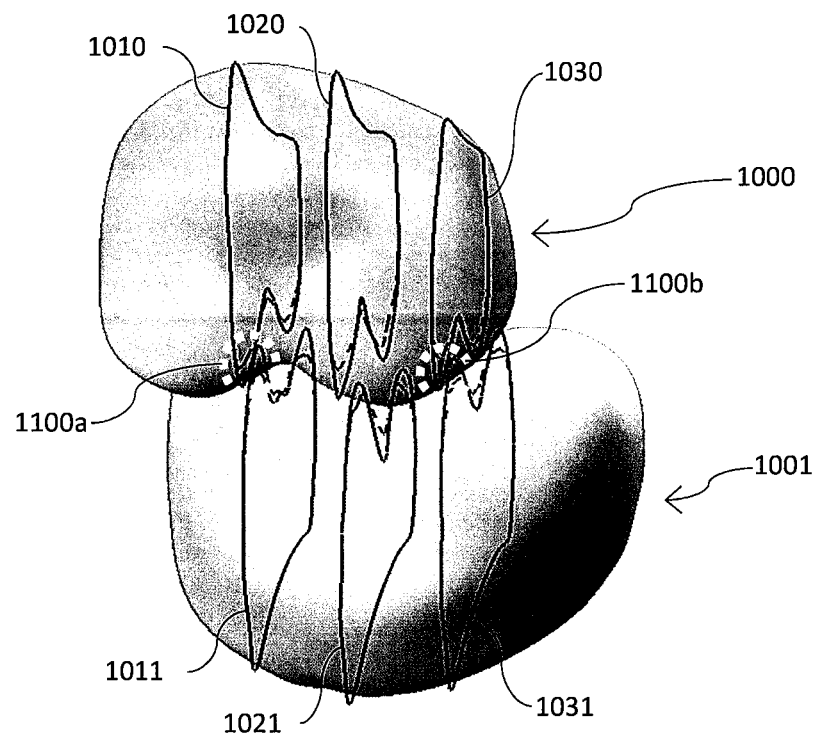
FIG. 10A shows an example perspective view of a plurality of digital cross-sectional plane outlines distributed across two opposing reference posterior tooth forms, where the digital cross-sectional planes are positioned orthogonally to the mesio-distal direction of the dentulous arch form.
Figure 10B:
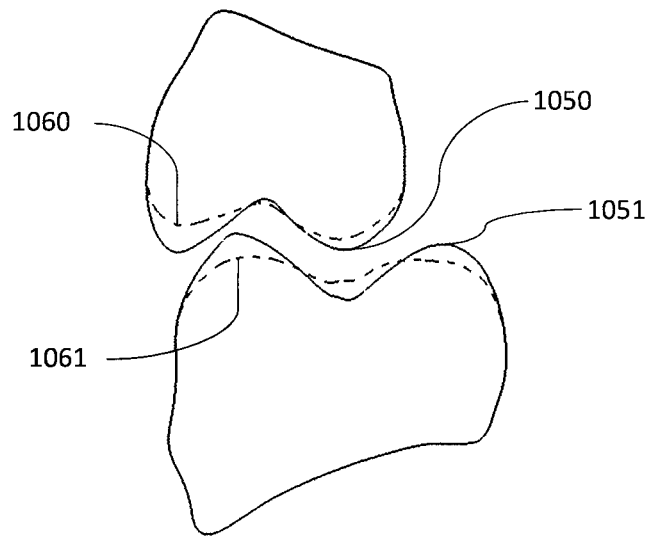
FIG. 10B shows an example of a single set of digital cross-sectional plane outlines for two opposing reference posterior tooth forms, from the viewpoint of the mesio-distal direction, where the outlines of posterior tooth forms having a reference occlusal depth are displayed in comparison to the outlines of the tooth forms having a modified target occlusal depth.

Depending on the desired occlusal depth sought in relation to the initial occlusal depth, a plurality of points and/or surfaces within the cusp positions and groove positions of the occlusal surface may be modified to achieve the desired occlusal depth. These points and/or surfaces may be modified to contract or expand in the corono-apical direction to effect either a reduction or an increase in the surface relative to the initial occlusal depth. FIG. 10B shows a cross-sectional profile view comparison of exemplary reference tooth form outlines (1050 and 1051 solid outlines) with outlines of modified target occlusal depths (1060 and 1061 dashed outlines).

In one aspect, where a reduction of the initial reference occlusal depth to a target occlusal depth is sought, the cusp positions may be contracted or decreased in the corono-apical direction by about 50 percent of the difference between the initial reference occlusal depth and the target occlusal depth ($OD_{Ref}-OD_{Target}$), while also diminishing the groove positions in the corono-apical direction by about 50 percent of the difference between the initial reference occlusal depth and the target occlusal depth ($OD_{Ref}-OD_{Target}$). For example, if an initial reference occlusal depth of about 3.00 mm is sought to be reduced to a target occlusal depth of about 2.00 mm, the cusp positions may be contracted in the corono-apical direction by about 0.50 mm (i.e., about 50% of the 1.00 mm difference between the reference occlusal depth and the target occlusal depth), while also diminishing/reducing the groove positions in the corono-apical direction by about 0.50 mm (i.e., about 50% of the 1.00 mm difference). In alternative embodiments, the cusp positions may be contracted in the corono-apical direction by about 35% to about 45% (e.g., about 45%, or about 40%, or about 35%) of the difference between the initial reference occlusal depth and the target occlusal depth ($OD_{Ref}-OD_{Target}$), while diminishing the groove positions in the corono-apical direction by about 55% to about 65% (e.g., about 55%, or about 60%, or about 65%) of the difference between the initial reference occlusal depth and the target occlusal depth ($OD_{Ref}-OD_{Target}$), respectively. In still other alternative embodiments, the cusp positions may be contracted in the corono-apical direction by about 55% to about 65% (e.g., about 55%, or about 60%, or about 65%) of the difference between the initial reference occlusal depth and the target occlusal depth ($OD_{Ref}-OD_{Target}$), while diminishing the groove positions in the corono-apical direction by about 35% to about 45% (e.g., about 45%, or about 40%, or about 35%) of the difference between the initial reference occlusal depth and the target occlusal depth ($OD_{Ref}-OD_{Target}$), respectively.

In another aspect, where an increase of the initial reference occlusal depth to a target occlusal depth is sought, the cusp positions may be expanded in the corono-apical direction by about 50 percent of the difference between the target occlusal depth and the initial reference occlusal depth ($OD_{Target}-OD_{Ref}$), while also deepening the groove positions in the corono-apical direction by about 50 percent of the difference between the target occlusal depth and the initial reference occlusal depth ($OD_{Target}-OD_{Ref}$). For example, if an initial reference occlusal depth of about 2.00 mm is sought to be increased to a target occlusal depth of about 3.00 mm, the cusp positions may be expanded in the corono-apical direction by about 0.50 mm (i.e., about 50% of the 1.00 mm difference between the target occlusal depth and the reference occlusal depth), while also deepening the groove positions in the corono-apical direction by about 0.50 mm (i.e., about 50% of the 1.00 mm difference). In alternative embodiments, the cusp positions may be expanded in the corono-apical direction by about 35% to about 45% (e.g., about 45%, or about 40%, or about 35%) of the difference between the target occlusal depth and the initial reference occlusal depth ($OD_{Target}-OD_{Ref}$), while deepening the groove positions in the corono-apical direction by about 55% to about 65% (e.g., about 55%, or about 60%, or about 65%) of the difference between the target occlusal depth and the initial reference occlusal depth ($OD_{Target}-OD_{Ref}$), respectively. In still other alternative embodiments, the cusp positions may be expanded in the corono-apical direction by about 55% to about 65% (e.g., about 55%, or about 60%, or about 65%) of the difference between the target occlusal depth and the initial reference occlusal depth ($OD_{Target}-OD_{Ref}$), while deepening the groove positions in the corono-apical direction by about 35% to about 45% (e.g., about 45%, or about 40%, or about 35%) of the difference between the target occlusal depth and the initial reference occlusal depth ($OD_{Target}-OD_{Ref}$), respectively.

Without wishing to be bound by any theory, it is believed that reducing (or, in the alternative, increasing) occlusal depth using equal magnitudes of adjustment for the cusp and groove positions (i.e., 50% diminishment of cusp positions, with 50% diminishment of groove positions) can produce tooth forms with occlusal surfaces having the most consistent, or substantially same, functional and aesthetic characteristics as the reference tooth forms from which they were modified. Also, without wishing to be bound by any theory, it is believed that reducing (or, in the alternative, increasing) occlusal depth using unequal magnitudes of adjustment for the cusp and groove positions (e.g., 40% diminishment of cusp positions, with 60% diminishment of groove positions) can produce tooth forms having occlusal surfaces that are more accommodative to changes in occlusal scheme set-up.

After the occlusal depth of an initial reference tooth form is adjusted to a target occlusal depth ($OD_{Target}$), geometry of the occlusal surface of neighboring reference posterior tooth forms, located within the same quadrant of the dentulous arch form as the initial reference posterior tooth form, may then be modified. More specifically, the occlusal depth of neighboring reference posterior tooth forms may be adjusted to conform to substantially the same ratio of target occlusal depth to initial reference occlusal depth ($OD_{Target}/OD_{Ref}$) established by the initial reference posterior tooth form. For example, if the ratio of target occlusal depth to initial reference occlusal depth ($OD_{Target}/OD_{Ref}$) established by the initial reference posterior tooth form is 2/3 (e.g., 2.00 mm/3.00 mm), then a first neighboring reference posterior tooth form having an initial occlusal depth of about 2.80 mm may be adjusted in accordance with this 2/3 ratio to establish an adjusted occlusal depth of about 1.87 mm for the first neighboring reference posterior tooth form. Likewise, a second neighboring reference posterior tooth form having an initial occlusal depth of about 3.15 mm may be adjusted in accordance with this 2/3 ratio to establish an adjusted occlusal depth of about 2.10 mm for the second neighboring reference posterior tooth form.

In a similar manner, the geometry of the occlusal surface of each opposing reference posterior tooth form, located within the opposing quadrant of the dentulous arch form disposed in opposing relation to the initial reference posterior tooth form, may be modified. More specifically, the occlusal depth of each opposing reference posterior tooth form may be adjusted to conform to substantially the same ratio of target occlusal depth to initial reference occlusal depth ($OD_{Target}/OD_{Ref}$) established by the initial reference posterior tooth form.

In another embodiment, geometry of the occlusal surface of each remaining reference posterior tooth form, located within the remaining quadrants of the maxillary and mandibular dentulous arch forms, may be modified. More specifically, the occlusal depth of each remaining reference posterior tooth form may be adjusted to conform to substantially the same ratio of target occlusal depth to initial reference occlusal depth ($OD_{Target}/OD_{Ref}$) established by the initial reference posterior tooth form.

In a further aspect, modifying the 3D digital model of a dentition model may be performed to adjust the mesio-distal width (203) of each reference posterior tooth form. Modifying the mesio-distal width of each reference posterior tooth form allows for the design of tooth form sizes that will better accommodate various patient-specific prosthetic size/spacing needs. Here, the mesio-distal width of each reference posterior tooth form may be ascertained. Then the mesio-distal width of each reference posterior tooth form may be adjusted by applying a predetermined scaling factor to the initial mesio-distal width. Thus, where a comparatively larger/longer mesio-distal width is needed to provide artificial tooth forms for patients requiring a larger dental prosthesis, an enlarging scale factor may be applied to uniformly expand or stretch the initial reference tooth form. Alternatively, where a comparatively smaller/shorter mesio-distal width is needed to provide artificial tooth forms for patients requiring a smaller dental prosthesis, a reducing scale factor may be applied to uniformly decrease or contract the initial tooth form. In a preferred embodiment, it may be advantageous for a selected scale factor to be made substantially the same value for each reference posterior tooth form located within the same dentulous arch form (i.e., same scale factor applied to all molars and all premolars within a maxillary arch form, and/or all molars and all premolars within a mandibular arch form).

In another embodiment, methods of the invention may also comprise a step of repositioning one or more cusp positions, one or more groove positions, or both within the occlusal surface to reduce interferences between occlusal surfaces of opposing reference posterior tooth forms. In the CAD software environment, a plurality of digital cross-sectional planes (see for example 1010, 1011, 1020, 1021, 1030, 1031 shown in FIG. 10A) may be generated and distributed across each of the reference posterior tooth forms, where the digital cross-sectional planes may be positioned orthogonally to the mesio-distal direction of the dentulous arch form. In a preferred embodiment, at least one of the digital cross-sectional planes may be generated and located at the maximum cusp height of each reference posterior tooth form. For each opposing reference posterior tooth form (such as 1000 and 1001 in FIG. 10A), the digital cross-sectional planes may be inspected for the presence of intersections or contacts that cause interference between the occlusal surfaces of opposing reference posterior tooth forms. For any intersections or contacts identified (see for example 1100a and 1100b as shown on FIG. 10A) between the occlusal surfaces of opposing reference posterior tooth forms, one or more points along the digital cross-sectional planes may be digitally repositioned or moved. Digitally repositioning points may be performed for diminishing cusp positions and/or groove positions in the corono-apical direction to reduce or remove those intersections or contacts, whereby the same occlusal scheme as the reference dentition model may be maintained, and the interocclusal distance may be maintained at substantially the same value as the reference dentition model.

Computer System for Digital Model Visualization, Preparation, and/or Modification One or more computer systems may be employed for 3D digital model visualization, preparation, and/or modification in accordance with at least some of the method embodiments described herein. Although various embodiments may be described herein in terms of an exemplary computer system, after reading this description, it may become apparent to a person skilled in the relevant art(s) how to implement the disclosure using other computer systems and/or architectures.

In one example embodiment herein, the computer system may include at least one computer processor and at least one modeling device, modeling system, user interface and input unit which may form at least part of any of the devices, components, and/or systems discussed herein. The computer processor may include, for example, a central processing unit, a multiple processing unit, an application-specific integrated circuit ("ASIC"), a field programmable gate array ("FPGA"), or the like. The processor may be connected to a communication infrastructure (e.g., a communications bus, or a network). In an embodiment herein, the processor may receive an indication that a design is in progress or the 3D digital model is being engaged and may obtain instructions concerning the dynamic adjustment of the 3D digital model view/orientation from a memory of the modeling system and/or from one or more storage units of the computer system. The processor may then load the instructions and execute the loaded instructions. This dynamic adjustment of the 3D digital model view/orientation may then be rendered on a display unit.

The user interface (or other output interface) may forward video graphics, text, and other data from the communication infrastructure (or from a frame buffer) for display on the display unit. For example, the user interface may include a video card with a graphics processing unit.

The computer system may also include an input unit that may be used by a user of the computer system to send information to the computer processor. In one embodiment, the input unit may be a trackball or other input device such as a keyboard or stylus or gesture recognition device. Alternatively, the input unit may be a finger or stylus to be used on a touchscreen interface. In one example, the display unit, the input unit, and the computer processor may collectively form a user interface.

One or more steps of generating dynamic adjustments may be stored on a non-transitory storage device in the form of computer-readable program instructions. To execute a procedure, the processor loads the appropriate instructions, as stored on a storage device, into memory and then executes the loaded instructions.

The computer system may further comprise a main memory, which may be a random-access memory ("RAM"), and also may include a secondary memory. The secondary memory may include, for example, a hard disk drive and/or a removable-storage drive (e.g., a floppy disk drive, a magnetic tape drive, an optical disk drive, a flash memory drive, and the like). The removable-storage drive may read from and/or write to a removable storage unit in a well-known manner. The removable storage unit may be, for example, a floppy disk, a magnetic tape, an optical disk, a flash memory device, and the like, which may be written to and read from by the removable-storage drive. The removable storage unit may include a non-transitory computer-readable storage medium storing computer-executable software instructions and/or data.

In further alternative embodiments, the secondary memory may include other computer-readable media storing computer-executable programs or other instructions to be loaded into the computer system. Such devices may include a removable storage unit and an interface (e.g., a program cartridge and a cartridge interface); a removable memory chip (e.g., an erasable programmable read-only memory ("EPROM") or a programmable read-only memory ("PROM")) and an associated memory socket; and other removable storage units and interfaces that allow software and data to be transferred from the removable storage unit to other parts of the computer system.

The computer system also may include a communications interface that enables software and data to be transferred between the computer system and external devices. Such an interface may include a modem, a network interface (e.g., an Ethernet card or an IEEE 802.11 wireless LAN interface), a communications port (e.g., a Universal Serial Bus ("USB") port or a FireWire® port), a Personal Computer Memory Card International Association ("PCMCIA") interface, Bluetooth®, and the like. Software and data transferred via the communications interface may be in the form of signals, which may be electronic, electromagnetic, optical or another type of signal that may be capable of being transmitted and/or received by the communications interface. Signals may be provided to the communications interface via a communications path (e.g., a channel). The communications path carries signals and may be implemented using wire or cable, fiber optics, a telephone line, a cellular link, a radio-frequency ("RF") link, or the like. The communications interface may be used to transfer software or data or other information between the computer system and a remote server or cloud-based storage.

One or more computer programs or computer control logic may be stored in the main memory and/or the secondary memory. The computer programs may also be received via the communications interface. The computer programs may include computer-executable instructions which, when executed by the computer processor, cause the computer system to perform the methods as described hereinafter. Accordingly, the computer programs may control the computer system and other components of the systems for visualization, preparation, and/or modification of 3D digital models.

In another embodiment, the software may be stored in a non-transitory computer-readable storage medium and loaded into the main memory and/or the secondary memory of the computer system using the removable-storage drive, the hard disk drive, and/or the communications interface. Control logic (software), when executed by the processor, causes the computer system, and more generally the system for visualization, preparation, and/or modification of 3D digital models, to perform all or some of the some of the methods described herein.

Implementation of such other hardware arrangement so as to perform the functions described herein will be apparent to persons skilled in the relevant art(s) in view of this description.

The previously described embodiments of the invention provide computer-aided methods of digitally design artificial teeth that are more effective and efficient than current physical/tangible methods of artificial tooth design. Methods of the invention offer distinct advantages for designing an extensive range of artificial posterior tooth sets or families for use in the fabrication of dentures, or other prosthetic dental devices, across a diverse patient population. Among these advantages, a great variety or breadth of options for natural-looking, functionally-effective posterior tooth forms can be created, evaluated, and refined across different occlusal schemes, in a much more rapid and cost-effective manner compared to existing physical design practices. Methods of the invention allow new contemplated design changes to be easily made, and easily corrected, duplicated, or cancelled/reversed in a virtual environment, in contrast to what can be accomplished in the traditional physical environment. Moreover, methods of the invention provide more precise dimensional definition and control of the occlusal surface shape or morphological features, and a more consistent and reliable process than the traditional physical design approach.

It should be understood that the present invention does not require that all the preferred or advantageous features, nor all the advantages, need to be incorporated into every embodiment of the invention. Although the present invention has been described in considerable detail with reference to certain preferred versions thereof, other versions are possible within the scope the invention. Therefore, the spirit and scope of the appended claims should not be limited to the description of the preferred versions contained herein. All of the features disclosed in this specification, including any accompanying claims, abstract, and drawings, may be replaced by alternative features serving the same, equivalent, or similar purpose, unless expressly stated otherwise. Thus, unless expressly stated otherwise, each feature disclosed is one example only of a generic series of equivalent or similar features.

What is claimed is:

1. A method of digitally designing posterior artificial teeth for use in a dental prosthesis and/or dental restoration, the method comprising the steps of:

a. providing a three-dimensional (3D) digital model of a dentition model having a maxillary dentulous arch form and a mandibular dentulous arch form, each of the maxillary and the mandibular dentulous arch forms include a plurality of reference anterior tooth forms and a plurality of reference posterior tooth forms, wherein both the maxillary and the mandibular dentulous arch forms are disposed in an opposing relation to one another so that a predetermined occlusal scheme and intercuspation of the dentition model is effectively created;

b. identifying an occlusal surface and a sub-occlusal surface for each reference posterior tooth form of the 3D digital model, wherein the occlusal surface is characterized by a non-zero occlusal depth of no more than about 5 mm;

c. modifying an initial reference posterior tooth form that is selected within one of the dentulous arch forms of the 3D digital model, wherein modifying an initial reference posterior tooth form comprises the steps of:
  i. ascertaining an initial reference occlusal depth ($OD_{Ref}$) for the initial reference posterior tooth form; and
  ii. modifying geometry of the occlusal surface of the initial posterior tooth form by adjusting the initial reference occlusal depth ($OD_{Ref}$) to a different target occlusal depth ($OD_{Target}$), while allowing the sub-occlusal surface of the initial reference posterior tooth form to remain substantially unchanged;
d. modifying each neighboring reference posterior tooth form, located within the same quadrant of the dentulous arch form of the 3D digital model as the initial reference posterior tooth form, wherein modifying each neighboring reference posterior tooth form comprises the steps of:
  i. ascertaining the occlusal depth for each neighboring reference posterior tooth form; and
  ii. modifying geometry of the occlusal surface of each neighboring reference posterior tooth form by adjusting the occlusal depth to conform to substantially the same ratio of target occlusal depth to initial reference occlusal depth ($OD_{Target}/OD_{Ref}$) established by the initial reference posterior tooth form; and
e. modifying each opposing reference posterior tooth form, located within the opposing quadrant of the dentulous arch form disposed in opposing relation to the initial reference posterior tooth form of the 3D digital model, wherein modifying each opposing reference posterior tooth form comprises the steps of:
  i. ascertaining the occlusal depth for each opposing reference posterior tooth form; and
  ii. modifying geometry of the occlusal surface of each opposing reference posterior tooth form by adjusting the occlusal depth to conform to substantially the same ratio of target occlusal depth to initial reference occlusal depth ($OD_{Target}/OD_{Ref}$) established by the initial reference posterior tooth form.

2. The method of claim 1, further comprising the step of modifying each remaining reference posterior tooth form, located within the remaining quadrants of the maxillary and mandibular dentulous arch forms, wherein modifying each remaining reference posterior tooth form comprises the steps of:
  a. ascertaining the occlusal depth for each remaining reference posterior tooth form; and
  b. modifying geometry of the occlusal surface of each remaining reference posterior tooth form by adjusting the occlusal depth to conform to substantially the same ratio of target occlusal depth to initial reference occlusal depth ($OD_{Target}/OD_{Ref}$) established by the initial reference posterior tooth form.

3. The method of claim 1, wherein providing the predetermined occlusal scheme for the 3D digital model comprises physically arranging the maxillary dentulous arch form and the mandibular dentulous arch form in a mechanical adjustable dental articulator.

4. The method of claim 1, wherein providing the predetermined occlusal scheme for the 3D digital model comprises digitally arranging the maxillary dentulous arch form and the mandibular dentulous arch form in a virtual adjustable dental articulator.

5. The method of claim 1, wherein the predetermined occlusal scheme is selected from lingualized occlusion, balanced occlusion, linear occlusion, and combinations thereof.

6. The method of claim 1, wherein the step of modifying geometry of the occlusal surface of reference posterior tooth forms is further characterized by repositioning a plurality of digital points, non-uniform rational basis spline (NURBS) surfaces, and/or subdivision (sub-D) surfaces that define a plurality of cusp positions and groove positions within the occlusal surface.

7. The method of claim 6, whereby a reduction of the initial reference occlusal depth ($OD_{Ref}$) to a lesser target occlusal depth ($OD_{Target}$) is achieved by contracting the cusp positions in the corono-apical direction by about 50 percent of the difference between the initial reference occlusal depth and the target occlusal depth ($OD_{Ref}-OD_{Target}$), and diminishing the groove positions in the corono-apical direction by about 50 percent of the difference between the initial reference occlusal depth and the target occlusal depth ($OD_{Ref}-OD_{Target}$).

8. The method of claim 6, whereby an increase of the initial reference occlusal depth ($OD_{Ref}$) to a target occlusal depth ($OD_{Target}$) is achieved by expanding the cusp positions in the corono-apical direction by about 50 percent of the difference between the target occlusal depth and the reference occlusal depth ($OD_{Target}-OD_{Ref}$), and deepening the groove positions in the corono-apical direction by about 50 percent of the difference between the target occlusal depth and the initial reference occlusal depth ($OD_{Target}-OD_{Ref}$).

9. The method of claim 6, further comprising the step of repositioning one or more cusp positions, or one or more groove positions, or both within the occlusal surface by:
  a. generating and distributing a plurality of digital cross-sectional planes across each of the reference posterior tooth forms, wherein the digital cross-sectional planes are positioned orthogonally to the mesio-distal direction of the dentulous arch form;
  b. inspecting the digital cross-sectional planes for the presence of intersections or contacts between the occlusal surfaces of opposing reference posterior tooth forms; and
  c. diminishing one or more cusp positions, or one or more groove positions, or both in the corono-apical direction to reduce or remove intersections or contacts between occlusal surfaces of opposing reference posterior tooth forms, whereby the same occlusal scheme as the dentition model is maintained, and the interocclusal distance is maintained at substantially the same value as the dentition model.

10. The method of claim 1, further comprising the step of modifying the mesio-distal width of each reference posterior tooth form, wherein modifying the mesio-distal width of each reference posterior tooth form comprises the steps of:
  a. ascertaining the mesio-distal width of each reference posterior tooth form; and
  b. applying a predetermined scaling factor to adjust the mesio-distal width of each reference posterior tooth form to a predetermined tooth form size for patient-specific dental prosthesis needs.

11. The method of claim 10, wherein the scaling factor is substantially the same value for each reference posterior tooth form located within the same dentulous arch form.

* * * * *